Aug. 2, 1960   E. L. MOORE   2,947,374
BATTERY HOLD-DOWN ADAPTER
Filed March 5, 1959   2 Sheets-Sheet 1
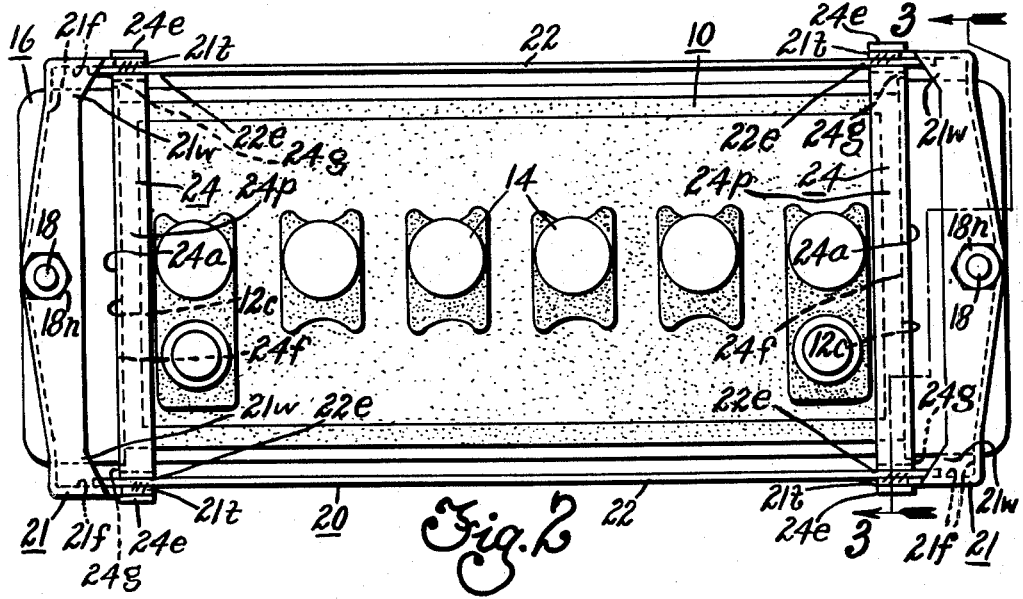
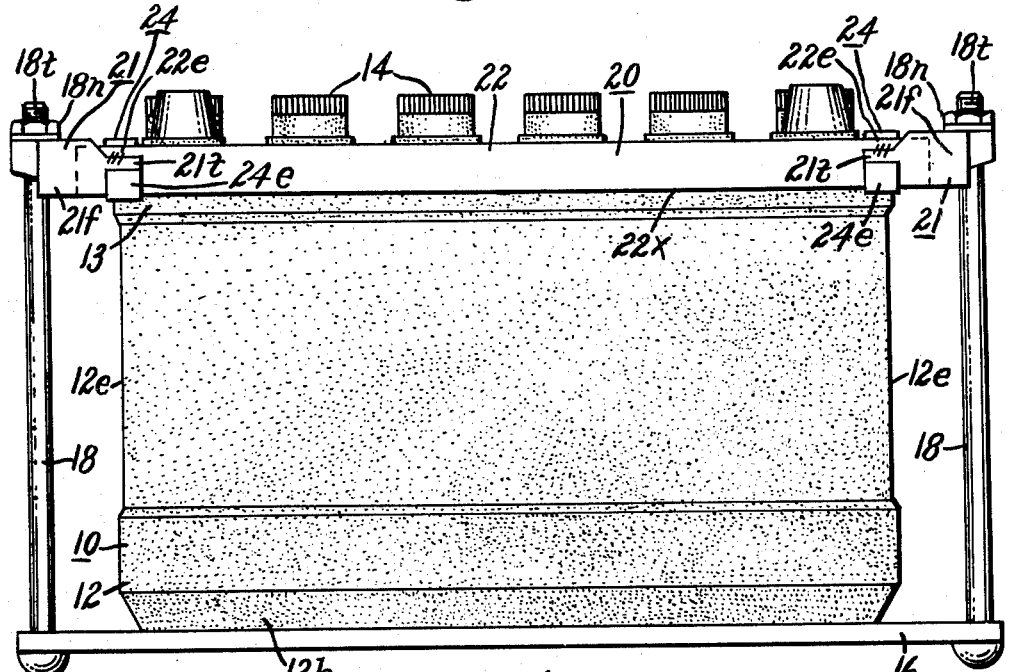
INVENTOR.
EDWIN L. MOORE
BY John T. Marvin
HIS ATTORNEY

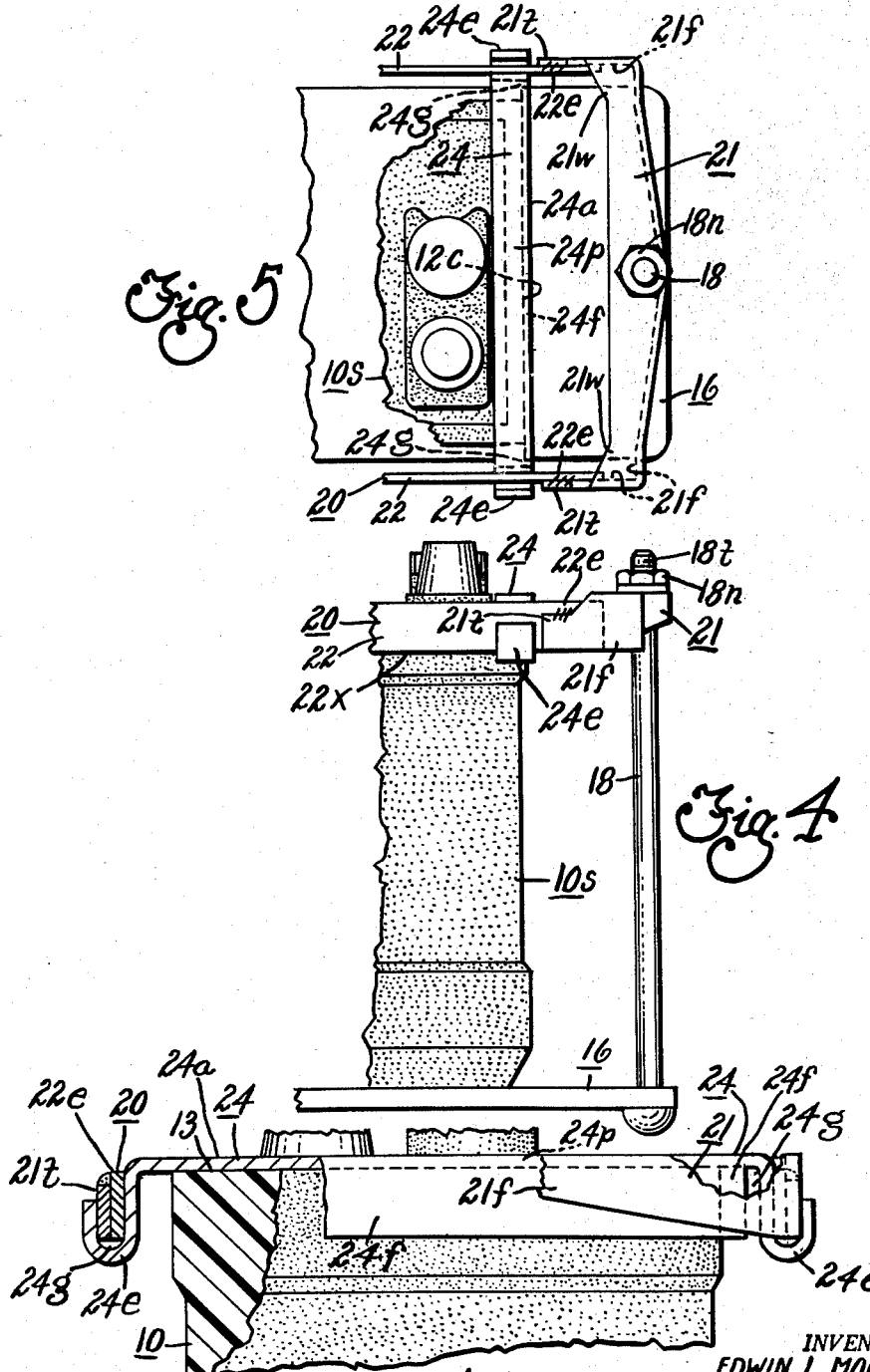

United States Patent Office 2,947,374
Patented Aug. 2, 1960

2,947,374

BATTERY HOLD-DOWN ADAPTER

Edwin L. Moore, Muncie, Ind., assignor to General Motors Corporation, Detroit, Mich., a corporation of Delaware Filed Mar. 5, 1959, Ser. No. 797,413
2 Claims. (Cl. 180—68.5)

This invention relates to battery retainer means, and particularly to a battery hold-down adapter usable for batteries of different voltage ratings and for batteries having differing lengths due to differences in number of cells and varying numbers of plates.

An object of this invention is to provide a new and improved battery hold-down and/or mounting device whereby batteries of various sizes and ratings can be accommodated using identical structure for mounting on a number of different makes of motor vehicles where battery length varies.

Another object of this invention is to provide a battery hold-down device including a shelf and longitudinally spaced fastening means thereof adjacent to opposite ends of a battery casing relative to which a frame is fitted having fixed end portions thereon and two spaced longitudinally extending fixed side frame portions between which pass slidable transverse frame members adjustable only on both of the longitudinal portions so as to secure the battery casing relative to the shelf under force applied adjacent to longitudinally spaced ends of the battery casing.

A further object of this invention is to provide a frame for use in mounting batteries of differing length on one side of a supporting shelf and including a pair of end portions each having a centrally located opening through which a shelf-mounted bolt means can project and each having a pair of transversely extending tabs to which are attached two spaced longitudinally extending side frame portions both of which are adjustably engaged by longitudinally slidable transverse frame members having hook-shaped ends adapted to be positioned and placed under said longitudinally extending side frame portions.

Another object of this invention is to provide a battery hold-down adapter frame to permit installation of batteries having various sizes and/or ratings though using a single shelf for mounting with the same mounting bolt means adaptable at longitudinally opposite ends of the frame including a pair of end portions spaced a fixed distance from each other and each having opposite ends attached to a pair of longitudinally extending side frame portions both of which are engaged by opposite substantially U-shaped ends of a pair of longitudinally slidable and adjustable transverse frame members having a substantially L-shaped angular midportion adapted to engage upper edges of longitudinally spaced ends of a battery casing.

Further objects and advantages of the present invention will be apparent from the description, reference being had to the accompanying drawings wherein preferred embodiments of the present invention are clearly shown.

In the drawings:

Figure 1 is a side view of a battery and retainer means in accordance with the present invention.

Figure 2 is a plan view of the battery and retainer means of Figure 1.

Figure 3 is a fragmentary partially section view taken along line 3—3 of Figure 2.

Figure 4 is a fragmentary side view of the same retainer means of Figure 1 used to install a battery of a size or rating differing from that shown in Figure 1.

Figure 5 is a fragmentary plan view of the battery and retainer means of Figure 4.

Figure 1 illustrates a battery generally indicated by numeral 10 having a body portion or casing 12 and a top or cover portion 13 fitted with a plurality of filler caps 14 in a usual manner. The battery casing has opposite longitudinally spaced end portions 12e and has a base 12b that rests upon a platform or shelf generally indicated by numeral 16. The shelf is generally rectangular in shape and includes slots or apertures at opposite ends adapted to receive a head portion of longitudinally spaced fastening means 18. These fastening means or shelf-mounting bolt means form part of a battery hold-down adaptor and/or mounting device whereby batteries of various sizes and ratings can be accommodated using identical battery retainer or mounting means.

The battery retainer means in accordance with the present invention can be better seen in Figure 2 and includes a rectangular frame generally indicated by numeral 20. This battery hold-down adapter frame 20 is attachable at longitudinally opposite ends of the frame to the fastening means 18 provided with threaded ends 18t onto which nuts 18n are fitted. It is to be understood that the frame includes a pair of end portions 21 spaced a fixed distance from each other. The end portions 21 have downwardly extending flanges 21f substantially transverse to shelf 16 which is parallel with each end portion 21 of the frame. The purpose of the flanges 21f is to increase rigidity of the end portions of the frame so as to avoid bending and collapse thereof when force is applied relative thereto by tightening of nuts 18n relative the threaded ends 18t of bolts 18. Each of the end portions of the frame includes a pair of tabs 21t extending transversely relative to both the end portions 21 and the shelf 16 as well as at least a portion of the flanges 21f. The tabs 21t are integral with the end portions 21 and a web 21w joins each tab 21t, end portions 21 and a longitudinally extending section of flange 21f adjacent to the end portion. A pair of spaced longitudinally extending side frame portions 22 form part of the battery retainer means and are joined preferably by welding at opposite ends 22e relative to the tabs 21t of the end portions 21 of the frame means. Preferably the ends 22e are located and joined laterally inside the tab 21t and a rigid rectangular structure is formed.

In accordance with the present invention the end portions 21 do not directly engage the top or cover 13 of the battery casing 12. A pair of longitudinally slidable transverse frame members generally indicated by numeral 24 can be positioned to engage upper and outer edges of the top or cover 13 of battery casing 12. A better view of the transverse frame members 24 is provided in Figure 3 which is a fragmentary cross-sectional elevational view taken along line 3—3 in Figure 2. Each of the transverse frame members includes opposite substantially U-shaped ends 24e and an angular midportion or body section 24a adapted to engage longitudinally spaced upper corners or edges of the battery casing. The midportion 24a is substantially L-shaped or angular in cross section and includes a central platform portion 24p integral along one edge with the downwardly extending flange portion 24f visible in Figures 2, 3, and 5. The platform portion 24p is adapted to provide an under surface directly engageable relative to a portion of the battery casing immediately adjacent to an upper corner 12c of a battery casing. The flange portion 24f is adapted to abut against a lateral surface of the battery casing or cover immediately adjacent to the upper surface. The transverse frame members 24 having the hook-shaped ends 24e can be positioned transverse to the longitudinally extending side frame portions 22 at suitable locations for engaging opposite longitudinal ends of batteries having different ratings and sizes. The hook-shaped ends 24e are provided with openings or grooves 24g having a width slightly greater than the combined width of the tabs 21t of the end portion 21 of the frame and of the side frame portions at ends 22e which are joined to the tabs. Thus, as shown in Figures 1 and 2 the hook-shaped ends 24e can be fitted under both the tabs 21t and ends 22e to provide the largest frame size relative to a battery having a relatively greater number of plates or grids and/or cells.

Figures 4 and 5 show the substantially U-shaped ends 24e engaging only a lower edge 22x of the side frame portions. This positioning of the transverse frame member 24 permits mounting of a smaller battery 10s relative to the same shelf and using identical fastening means 18 and the same frame means generally indicated by numeral 20. The transverse frame members 24 can be moved to an infinite number of positions at right angles to the longitudinally extending side frame portions.

An advantage of the battery retainer means or hold-down adapter in accordance with the present invention is that the transverse frame members 24 can be adjusted to be positioned in abutting relationship relative to longitudinal ends of battery casings of variable length. A single battery hold-down device in accordance with the present invention can be used to mount batteries for a number of different makes of motor vehicles wherein battery length varies. In all cases the batteries are made to have the same width due to the fact that the grids or plates are made to the same size using identical machines. However, the length of the battery varies accordingly when cells are provided with 15 plates or 17 plates, for example, and also varies according to the number of cells whereby the same hold-down device can be used for 6 and 12 volt batteries.

The flange 24f of the midportion 24a of the transverse frame member 24 adds rigidity to the transverse frame members such that tightening of the nuts 18n relative to rotated ends 18t of the fastening means 18 will not effect a buckling or collapse and/or deformation of the transverse frame members. The flanges 24f together with the undersurface of platform portion 24p centrally relative to the frame members are adapted to abut against and positively engage longitudinally opposite opened corners of the battery casing or top. This engagement by the transverse frame means relative to the battery particularly by the flanges 24f assures against longitudinal sliding of the bottom of the battery relative to shelf 16. Tightening of the nuts 18n effects hold-down of the battery relative to the shelf 16 particularly due to the engagement of ends 24e underneath the longitudinally extending side frame portions 22. The end portions 24e are substantially transverse to each flange 24f which are spaced a small distance laterally away from each other as evidenced by a gap 24g visible in Figures 2, 3 and 5.

While the embodiments of the present invention as herein described constitute preferred forms, it is to be understood that other forms might be adopted.

What is claimed is as follows:

1. A battery hold-down adapter, comprising, a frame for use in mounting batteries of differing length on one side of a supporting shelf and including a pair of end portions having a pair of transversely extending tabs as well as two spaced longitudinally extending side frame portions attached adjacent opposite ends to said tabs, and a pair of separable, longitudinally slidable transverse frame members having hook shaped ends adapted to be positioned and placed under said longitudinally extending side frame portions.

2. A battery hold-down adapter frame to permit installation of batteries having various sizes and/or ratings though using a single shelf for mounting with the same bolt means attachable at longitudinally opposite ends of the frame, comprising, a pair of end portions spaced a fixed distance from each other and each having opposite ends attached to a pair of longitudinally extending side frame portions, and a pair of longitudinally slidable and adjustable transverse frame members having a substantially L-shaped angular midportion adapted to engage upper edges of longitudinally spaced ends of a battery casing, said frame members each having opposite U-shaped ends adapted to engage said longitudinally extending side frame portions.

References Cited in the file of this patent

UNITED STATES PATENTS 1,621,176    Sonin ---------------- Mar. 15, 1927